US012031949B2

(12) United States Patent
Diep et al.

(10) Patent No.: US 12,031,949 B2
(45) Date of Patent: Jul. 9, 2024

(54) PREVENTING EPOXY BLEED-OUT FOR BIOSENSOR DEVICES

(71) Applicant: QORVO US, INC., Greensboro, NC (US)

(72) Inventors: Buu Quoc Diep, Murphy, TX (US); John Belsick, Bend, OR (US); Matthew Wasilik, Plano, TX (US); Rio Rivas, Bend, OR (US); Bang Nguyen, Plano, TX (US); Derya Deniz, McKinney, TX (US)

(73) Assignee: Qorvo US, Inc., Greensboro, NC (US)

( * ) Notice: Subject to any disclaimer, the term of this patent is extended or adjusted under 35 U.S.C. 154(b) by 242 days.

(21) Appl. No.: 17/776,540

(22) PCT Filed: Jun. 29, 2020

(86) PCT No.: PCT/US2020/040074
§ 371 (c)(1),
(2) Date: May 12, 2022

(87) PCT Pub. No.: WO2021/096568
PCT Pub. Date: May 20, 2021

(65) Prior Publication Data
US 2022/0404318 A1 Dec. 22, 2022

Related U.S. Application Data

(60) Provisional application No. 62/935,847, filed on Nov. 15, 2019.

(51) Int. Cl.
*G01N 29/22* (2006.01)
*G01N 29/02* (2006.01)
(Continued)

(52) U.S. Cl.
CPC ......... *G01N 29/222* (2013.01); *G01N 29/022* (2013.01); *G01N 29/036* (2013.01);
(Continued)

(58) Field of Classification Search
CPC .. G01N 29/222; G01N 29/022; G01N 29/036; G01N 29/32; G01N 2291/0255; G01N 2291/0426; G01N 2291/0256
See application file for complete search history.

(56) References Cited

U.S. PATENT DOCUMENTS 5,969,461 A * 10/1999 Anderson ............... H01L 24/32
29/841
10,302,595 B2 * 5/2019 Belsick ............... G01N 29/022
(Continued)

FOREIGN PATENT DOCUMENTS

EP    2216904 A1    11/2010
JP    2015220264 A  12/2015
(Continued)

OTHER PUBLICATIONS

International Search Report and Written Opinion mailed Oct. 1, 2020 in International Application No. PCT/US2020/040074, 8 pages.
(Continued)

*Primary Examiner* — Francis C Gray
(74) *Attorney, Agent, or Firm* — Haynes and Boone, LLP

(57) ABSTRACT

A fluidic device and a method of preventing isolation material from bleed-out therein is described herein. The fluidic device includes a bulk acoustic wave resonator structure defining at least one surface area region on which a functionalization material is disposed and the resonator structure includes a repelling area. The fluidic device also includes isolation material disposed on the resonator structure and away from the at least one surface area region. The
(Continued)

repelling area is configured to prevent the isolation material from extending into the at least one surface area region. Further, an electronic board may be operably attached to the resonator structure and the isolation material may be disposed in a gap therebetween to electrically isolate electrical contacts and form a fluidic channel.

20 Claims, 12 Drawing Sheets

(51) Int. Cl.
    *G01N 29/036*     (2006.01)
    *G01N 29/32*     (2006.01)

(52) U.S. Cl.
    CPC ..... *G01N 29/32* (2013.01); *G01N 2291/0255* (2013.01); *G01N 2291/0426* (2013.01)

(56) References Cited

U.S. PATENT DOCUMENTS

| | | | |
|---|---|---|---|
| 2005/0116263 | A1 | 6/2005 | Lu et al. |
| 2005/0148065 | A1 | 7/2005 | Zhang et al. |
| 2008/0247264 | A1 | 10/2008 | Gabl et al. |
| 2012/0181710 | A1 | 7/2012 | Vaupel |
| 2017/0138935 | A1 | 5/2017 | Rivas |
| 2017/0168017 | A1* | 6/2017 | Rivas ................. H03H 9/02007 |
| 2018/0048280 | A1* | 2/2018 | Ryder ................... H03H 9/175 |
| 2019/0341885 | A1 | 11/2019 | Jackson et al. |
| 2020/0353463 | A1* | 11/2020 | Rivas ................... G01N 29/222 |

FOREIGN PATENT DOCUMENTS

| | | |
|---|---|---|
| JP | 2018-537672 A | 12/2018 |
| JP | 2019-526051 A | 9/2019 |
| WO | 2009-066640 A1 | 5/2009 |
| WO | 2017/087929 A1 | 5/2017 |
| WO | 2018/022758 A1 | 2/2018 |

OTHER PUBLICATIONS

Livelo et al., "Microdot Epoxy Stamping Process Qualification for Substrate Based Optocoupler BGA Packaging," 10th Electronics Packaging Technology Conference, 2008, 6 pages.

Burmeister et al., "Preventing Adhesive Resin Bleed in Microelectronics Assembly through Gas Plasma Technology," In Proceedings 38th International symposium on microelectronics, IMAPS, 2005, 8 pages.

Kanagavel et al., "Optimization of die attach to surface-enhanced lead frames for MSL-1 performance of QFN packages (part 1)," Chip Scale Review, Mar.-Apr. 2017, pp. 1-3.

Hart et al., "Optimization of die attach to surface-enhanced lead frames for MSL-1 performance of QFN packages (part 2)," Chip Scale Review, Jul.-Aug. 2017, pp. 22-25.

International Preliminary Report on Patentability mailed May 17, 2022 in International Application No. PCT/US2020/040074, 6 pages.

Extended European Search Report dated Nov. 22, 2023 from related application EP 20888617.6, 11 pages.

El Fissi et al., "Fabrication and packaging technologies of Love-wave-based microbalance for fluid analysis," Sensors and Actuators A: Physical, Aug. 1, 2010, No. 162, pp. 304-309.

Zhang et al., "Solutions for controlling resin bleed-out: Semiconductor Digest," Dec. 1, 2017, pp. 1-6, [online], [retrieved on Nov. 2, 2023]. Retrieved from the Internet <https://sst.semiconductor-digest.com/2017/12/solutions-for-controlling-resin-bleed-out/>.

Office Action mailed Jul. 4, 2023 in Japanese application No. 2022-528025, received Aug. 1, 2023, original and translation, 5 pages.

* cited by examiner

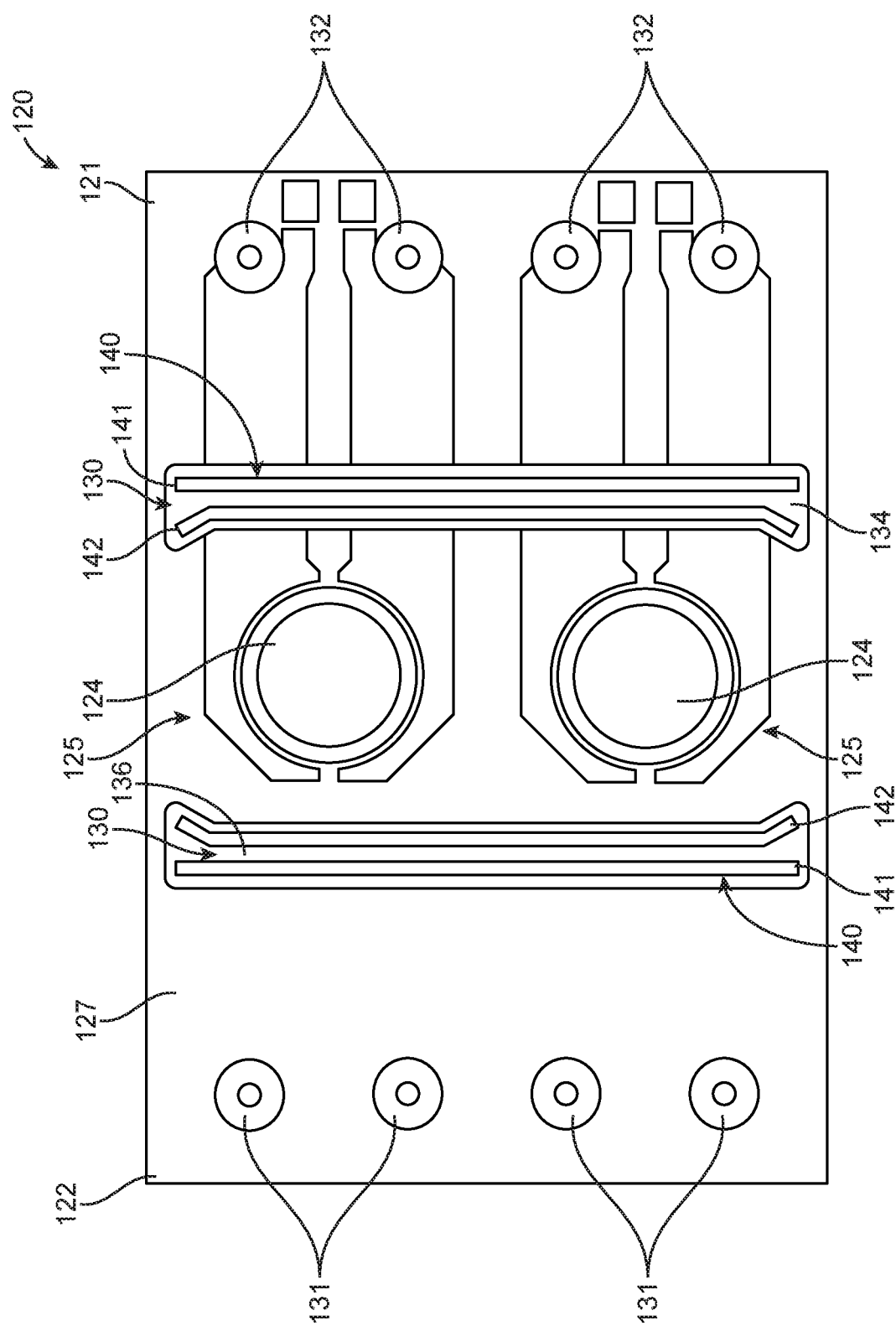

PREVENTING EPOXY BLEED-OUT FOR BIOSENSOR DEVICES

CROSS-REFERENCE TO RELATED APPLICATION

The present application is a U.S. National Stage patent application of International Patent Application No. PCT/US2020/040074, filed on Jun. 29, 2020, which claims the benefit of U.S. Provisional Application No. 62/935,847 filed Nov. 15, 2019, the benefit of which is claimed and the disclosures of which are incorporated herein by reference in their entirety.

TECHNICAL FIELD

This disclosure generally relates to sensor devices, such as bulk acoustic wave (BAW) sensor devices. In particular, the present disclosure relates to controlling the flow of isolation materials.

BACKGROUND

A biosensor (or biological sensor) is an analytical device including a biological element and a transducer that converts a biological response into an electrical signal. Certain biosensors involve a selective biochemical reaction between a specific binding material (e.g., an antibody, a receptor, a ligand, etc.) and a target species (e.g., molecule, protein, DNA, vims, bacteria, etc.), and the product of this highly specific reaction is converted into a measurable quantity by a transducer. Other sensors may utilize a nonspecific binding material capable of binding multiple types or classes of molecules or other moieties that may be present in a sample. The term "functionalization material" may be used herein to generally relate to both specific and nonspecific binding materials. Transduction methods used with biosensors may be based on various principles, such as electrochemical, optical, electrical, acoustic, etc. Among these, acoustic transduction offers a number of potential advantages, such as being real time, label-free, and low cost, as well as exhibiting high sensitivity.

An acoustic wave device employs an acoustic wave that propagates through or on the surface of a specific binding material, whereby any changes to the characteristics of the propagation path affect the velocity and/or amplitude of the wave. Acoustic wave devices are commonly fabricated by micro-electro-mechanical systems (MEMS) fabrication techniques, owing to the need to provide microscale features suitable for facilitating high-frequency operation. Presence of functionalization material on or over an active region of an acoustic wave device permits an analyte to be bound to the functionalization material, thereby altering the mass being vibrated by the acoustic wave and altering the wave propagation characteristics (e.g., velocity, thereby altering resonance frequency). Changes in velocity can be monitored by measuring the frequency, amplitude-magnitude, and/or phase characteristics of the acoustic wave device and can be correlated to a physical quantity being measured.

Typically, BAW devices are fabricated by micro-electro-mechanical systems (MEMS) fabrication techniques owing to the need to provide microscale features suitable for facilitating high frequency operation. In the context of biosensors, functionalization materials (e.g., specific binding materials; also known as bioactive probes or agents) may be deposited on sensor surfaces by various techniques, such as microarray spotting (also known as microarray printing). Functionalization materials providing non-specific binding utility (e.g., permitting binding of multiple types or species of molecules) may also be used in certain contexts, such as chemical sensing.

Existing processes for manufacturing an array of resonators includes many challenges. For example, epoxy is a commonly used underfill material for the packaging of microelectronic components. However, because epoxy may be an adhesive with fillers, there is a known phenomenon termed bleed-out associated with the use of epoxy. Bleed-out is essentially separation on various components of the adhesive due to difference in surface energy of the substrate and the surface tension of the adhesive.

When using epoxy as underfill for BAW devices, the epoxy may bleed-out to positions on the BAW device that is undesirable, often epoxy may bleed along thinfilm features of device features that may be described as Dark Line Defect (DLD). DLD may present issues for a BAW device because it may cause frequency shifts that could be detected by the sensors. The frequency shifts may be large and variable, and could affect performance of the BAW device.

Various techniques have been used to control the bleed-out by the electronic packaging industry. For example, the epoxy formulation may be altered to modulate surface tension and/or the substrate surface may be altered to modulate surface energy. However, in some applications (e.g., because of qualifications and biochemistry requirements), it may be difficult to simply change epoxy formulation and/or the surface of the device. For example, in some applications, the top surface of the device may be atomic layer deposition (ALD) of silicon dioxide (SiO2) as a functionalized layer and/or a specific epoxy may have an established compatibility history with various assay solutions, therefore, changes to the top surface and/or the epoxy may add risks and/or cause incompatibility problems. It may be desirable to provide a BAW device design that prevents epoxy bleed-out, e.g., to avoid undesirable frequency shifts that may decrease performance of the device.

SUMMARY

Embodiments described herein may provide a BAW device that prevents uncontrolled epoxy bleed-out or wicking into undesirable areas (e.g., a bio-active area) of the device. For example, the BAW device may include a repelling area of the resonator structure or die (e.g., a surface, a layer, etc.) configured to prevent the epoxy from entering the repelling area. The repelling area may be positioned and oriented around at least a portion of the bio-active area such that the epoxy cannot flow through the repelling area and interfere with the bio-active area. In other words, the repelling area may act as a barrier between the epoxy and the bio-active area. Therefore, device performance may not be disrupted by epoxy bleed-out because of the repelling area.

Those skilled in the art will appreciate the scope of the present disclosure and realize additional aspects thereof after reading the following detailed description in association with the accompanying drawings.

An illustrative fluidic device may include a bulk acoustic wave resonator structure and an isolation material. The bulk acoustic wave resonator structure may define at least one surface area region on which a functionalization material is disposed and the resonator structure may include a repelling area. The isolation material may be disposed on the resonator structure and away from the at least one surface area region. The repelling area may be configured to prevent the isolation material from extending into the at least one surface area region.

In one or more embodiments, the fluidic device may further include an electronic board attached to the resonator structure such that a gap is formed between the electronic board and the resonator structure. The isolation material may be disposed in at least a portion of the gap.

In one or more embodiments, the fluidic device may further include electrical contacts operably connecting the electronic board and the resonator structure. The isolation material may surround the electrical contacts to electrically isolate the electrical contacts from an external environment.

In one or more embodiments, the bulk acoustic wave resonator structure may include a surface layer and the repelling area is exposed through the surface layer.

In one or more embodiments, the repelling area may be located between the isolation material and the at least one surface area region.

In one or more embodiments, the fluidic device may further comprise at least one wall extending away from the resonator structure and positioned adjacent to at least a portion of the at least one surface area region.

In one or more embodiments, the repelling area may surround the at least one wall.

In one or more embodiments, the bulk acoustic wave resonator structure may extend between a first end and a second end. A first portion of the isolation material may be disposed at the first end of the resonator structure and a second portion of the isolation material may be disposed at the second end of the resonator structure such that the isolation material defines a fluidic channel between the first and second portions of the isolation material.

In one or more embodiments, the resonator structure may define a top surface. The repelling area may be recessed from the top surface.

In one or more embodiments, the repelling area may define a water contact angle of greater than 40.

Additionally, an illustrative method of preventing isolation material bleed-out for a fluidic device may include fabricating a bulk acoustic wave resonator structure. The bulk acoustic wave resonator structure may include a repelling area and may define at least one surface area region on which a functionalization material is disposed. The method may also include disposing an isolation material on the resonator structure and away from the at least one surface area region. Further, the method may include preventing the isolation material from extending into the at least one surface area region due to the repelling area.

In one or more embodiments, the method may also include attaching the bulk acoustic wave resonator structure to an electronic board such that a gap is formed between the resonator structure and the electronic board. The isolation material may be disposed in at least a portion of the gap.

In one or more embodiments, disposing the isolation material may include surrounding electrical contacts operably connected between the electronic board and the resonator structure to electrically isolate the electrical contacts from an external environment.

In one or more embodiments, fabricating the bulk acoustic wave resonator structure may include etching a surface layer of the resonator structure to expose the repelling area.

In one or more embodiments, disposing the isolation material may include disposing a first portion of the isolation material at a first end of the resonator structure and a second portion of the isolation material at a second end of the resonator structure.

In one or more embodiments, disposing the isolation material further may include forming a fluidic channel between the first and second portions of isolation material.

In one or more embodiments, fabricating the bulk acoustic wave resonator structure may include forming at least one wall extending from the resonator structure and positioned adjacent to at least a portion of the at least one surface area region.

In one or more embodiments, fabricating the bulk acoustic wave resonator structure may include forming the repelling area to surround the at least one wall.

In one or more embodiments, the repelling area may define a water contact angle of greater than 40.

In one or more embodiments, the repelling area may include hydrophobic material.

The above summary is not intended to describe each embodiment or every implementation. Rather, a more complete understanding of illustrative embodiments will become apparent and appreciated by reference to the following Detailed Description of Selected Embodiments and Claims in view of the accompanying figures of the drawing.

BRIEF DESCRIPTION OF DRAWINGS

Exemplary embodiments will be further described with reference to the figures of the drawing, wherein:

FIG. 3 illustrates a top plan view of an illustrative bulk acoustic wave resonator structure according to the present disclosure.

Figure 1:
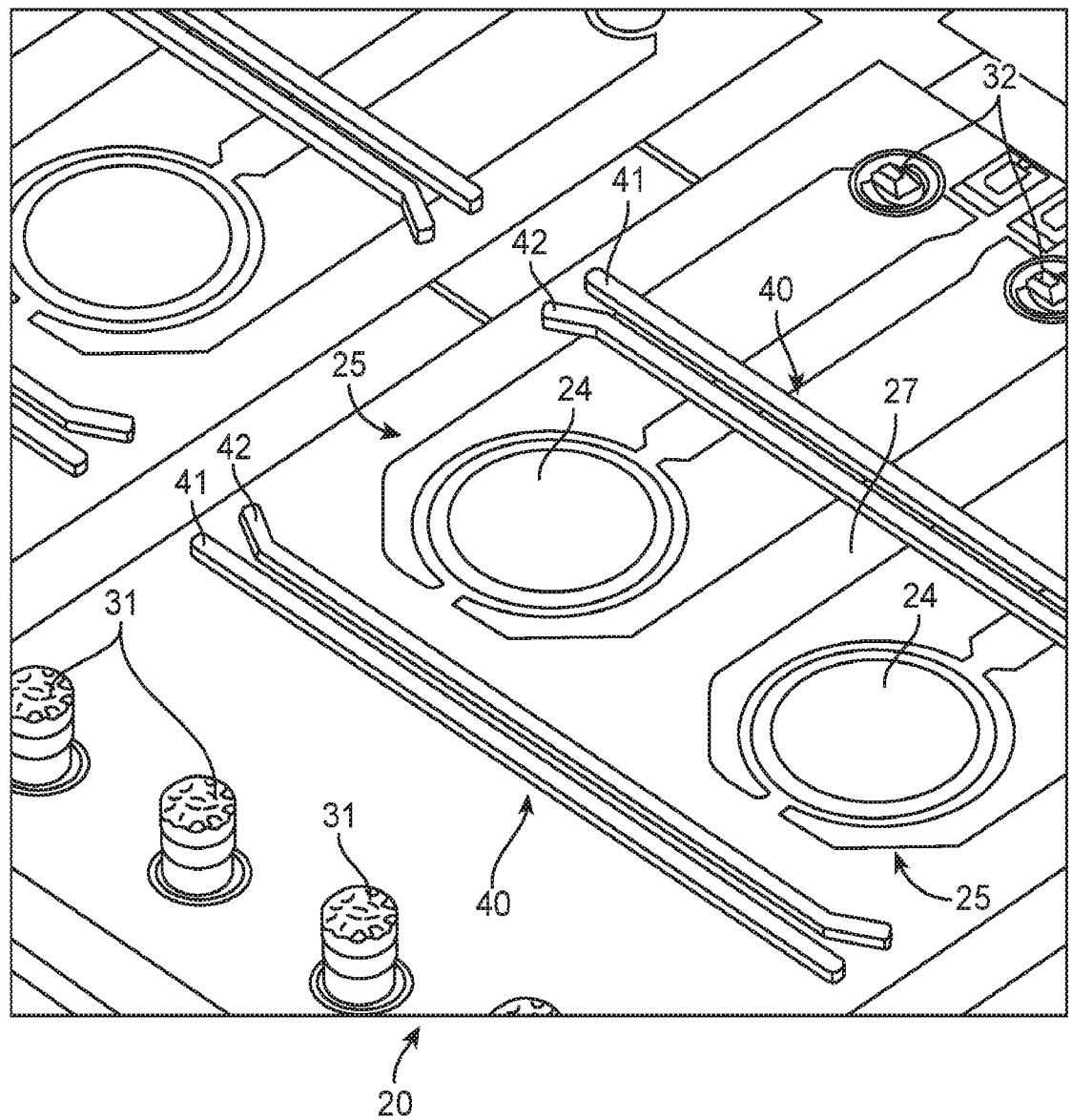
FIG. 1 illustrates a perspective view of a bulk acoustic wave resonator structure from the prior art.

The figures are rendered primarily for clarity and, as a result, are not necessarily drawn to scale. Moreover, various structure/components may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION

In the following detailed description, several specific embodiments of devices, systems and methods are disclosed. It is to be understood that other embodiments are contemplated and may be made without departing from the scope or spirit of the present disclosure. Reference is made to the accompanying figures of the drawing which form a part hereof. It is to be understood that other embodiments, which may not be described and/or illustrated herein, are certainly contemplated. The following detailed description, therefore, is not to be taken in a limiting sense.

The present disclosure relates to bulk acoustic wave (BAW) devices and their use as biosensors. In particular, the present disclosure relates to devices, such as cartridges, containing bulk acoustic wave resonators and may be used without capping a sample well port through which a sample material is introduced to the cartridge. Instead, the sample material may be introduced through the sample well port and move through a passage or channel due to wicking or capillary action. The sample material then binds with the functionalization material (e.g., binding material) as it travels through the passage or channel. Thereby, the mass being vibrated by the BAW resonators is altered and the change in velocity of the acoustic wave device can be monitored to determine a physical quantity (e.g., of the sample material) being measured.

Manufacturing an array of resonators often includes using epoxy as an underfill material for the packaging of microelectronic components. Specifically, the epoxy may be utilized to at least partially define a fluid flow channel and/or electrically isolate electrical contacts. However, the epoxy can sometimes bleed-out into various portions of the resonator in a way that is undesirable. For example, the epoxy bleed-out may interfere with signal feed lines, the active region or functionalization material, and cause large and variable shifts in frequency measurements of the resonator (e.g., affecting the measurement accuracy of the resonator).

The embodiments described herein may prevent uncontrolled epoxy bleed-out or wicking into undesirable areas of the resonator device. For example, the resonator device may include a repelling area of the resonator structure or patterned thinfilm feature that creates a physical barrier for the epoxy. In other words, the repelling area prevents the epoxy from flowing into or through repelling area and towards the bio-active area. The repelling area of the resonator structure or patterned thinfilm feature may take any suitable form such as, e.g., a surface or a layer of the resonator structure or thinfilm feature. Further, the repelling area may be positioned and oriented in any suitable way to prevent movement of the epoxy into the bio-active area. For example, the repelling area may be located around the entire perimeter of the bio-active area or may only be present at locations in which epoxy is disposed on the resonator. Further, in one or more embodiments, the repelling area may be a sub-layer located underneath at least a surface layer of the resonator structure or die and exposed (e.g., through etching, polymer photoresist mask, etc.) therethrough.

In the following detailed description several specific embodiments of compounds, compositions, apparatuses, systems and methods are disclosed. It is to be understood that other embodiments are contemplated and may be made without departing from the scope or spirit of the present disclosure. The following detailed description, therefore, is not to be taken in a limiting sense.

FIG. 1 illustrates a bulk acoustic wave (BAW) resonator 20 of a fluidic or BAW device as is known in the art. For example, the resonator 20 may define at least one surface area region 25 on which a functionalization material 24 is disposed. The at least one surface area region 25 including the functionalization material 24 may be described as a bio-active area upon which a sample material may bind with the functionalization material 24. Further, the at least one surface area region 25 may be defined by the overlapping of a first electrode and a second electrode with a piezoelectric material therebetween. An acoustic structure may be disposed over the at least one surface area region 25. Specifically, the resonator 20 illustrated in FIG. 1 includes two surface area regions on the top surface 27 of the resonator 20.

The resonator 20 includes mechanical contacts 31 and electrical contacts 32 protruding from the top surface 27 of the resonator 20. The mechanical contacts 31 and the electrical contacts 32 may be attached to an electronic board (not shown) and provide both a mechanical and an electrical connection between the resonator 20 and the electronic board. The resonator 20 also includes at least one wall 40 positioned between the electrical contacts 32 and the at least one surface area region 25. The at least one wall 40 extends along and protrudes from the top surface 27 of the resonator 20. As shown in FIG. 1, the resonator 20 includes two walls 40 extending generally parallel to one another on opposite sides of the at least one surface area region 25. Specifically, the inner wall 42 defines a middle portion extending along a straight line with each of the ends extending inwardly and the outer wall 41 extends along a straight line that is parallel to the middle portion of the inner wall 42.

Figure 2A:
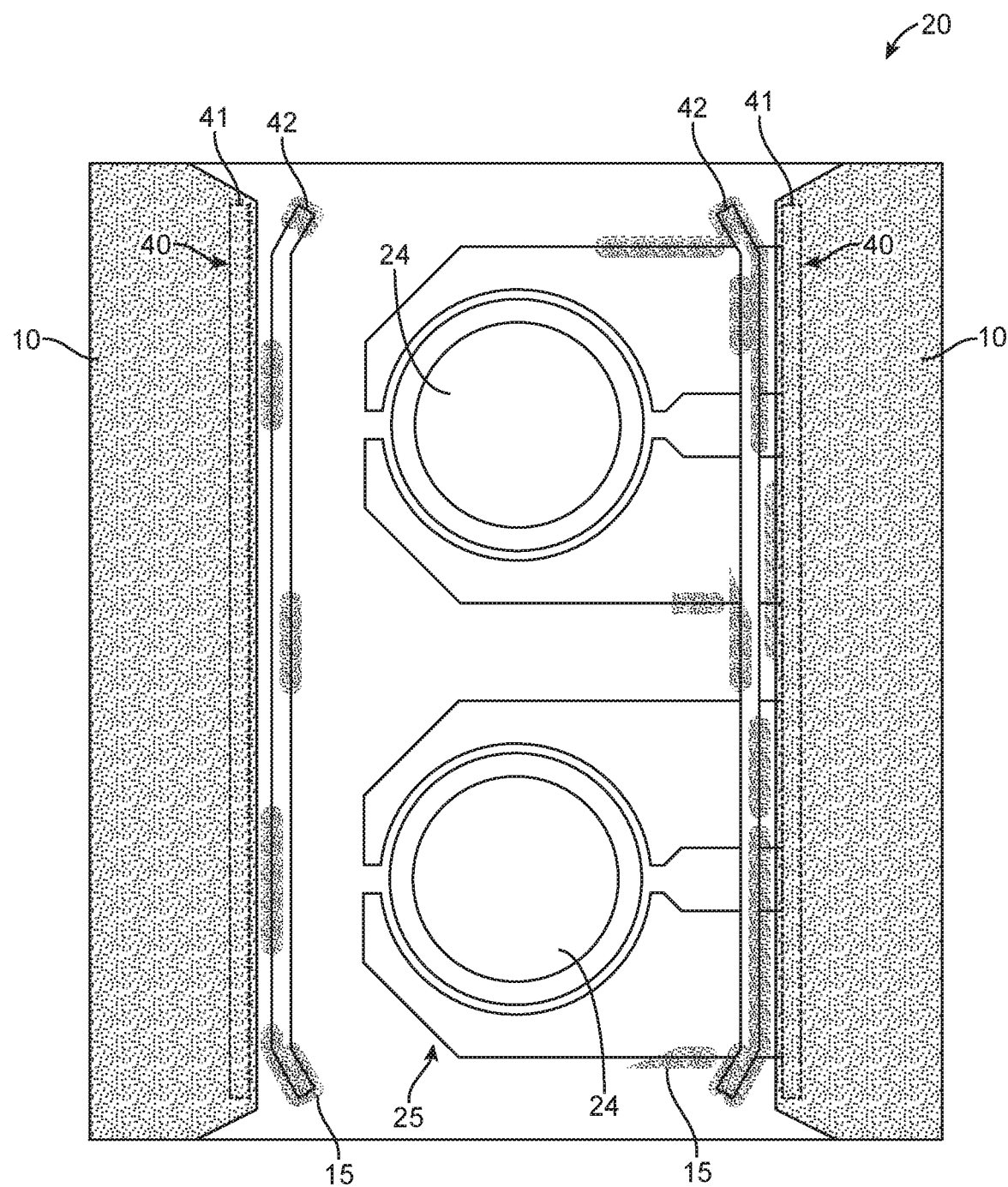
FIG. 2A illustrates a top view of the bulk acoustic wave resonator structure of FIG. 1 showing isolation material bleeding out towards an area including functionalization material.
Figure 2B:
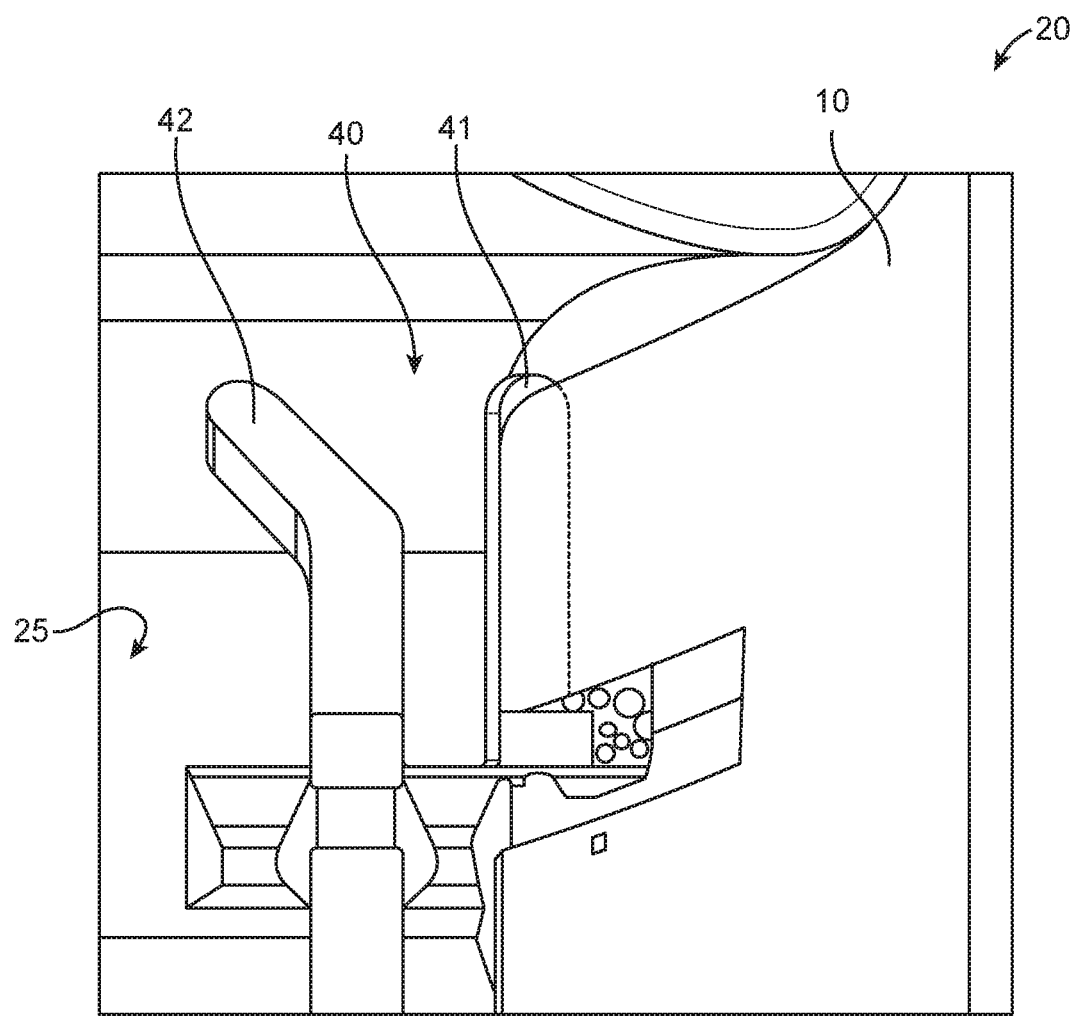
FIG. 2B illustrates an expanded perspective view of the bulk acoustic wave resonator structure of FIG. 2A.

The prior art resonator 20 having isolation material 10 (e.g., epoxy) disposed thereon is illustrated in FIGS. 2A and 2B. The isolation material 10 is located over the mechanical contacts 31 and the electrical contacts 32 (shown in FIG. 1) and on either side of the at least one surface area region 25 (e.g., proximate the walls 40). As shown, the isolation material 10 is encompassing the outer wall 41 and extending towards the inner wall 42 (on both sides). Further, the isolation material 10 is bleeding-out or wicking 15 along the inner wall 42 and other electrical components within the at least one surface area region 25. In other words, the isolation material 10 is attaching to and extending along edges and interfaces (e.g., between the top surface 27, the walls 40, the photoimageable epoxy, etc.) to "creep" into the at least one surface area region 25. This bleeding-out or wicking 15 of the isolation material 10 may be described as dark line defects that affect the operation of the resonator 20 in an undesirable way (e.g., creating variability in frequency measurements).

A bulk acoustic wave (BAW) resonator structure 120 (e.g., of a fluidic sensor device) in accordance with the present disclosure is illustrated in FIG. 3. A suitable substrate material for the device may include silicon, alumina, sapphire, or another semiconductor material. In one or more embodiments, the resonator structure 120 may be described as a die. The resonator structure 120 may define at least one surface area region 125 on which a functionalization material 124 is disposed (e.g., similar to the resonator 20 described in relation to FIG. 1). In other words, the at least one surface area region 125 may include a bio-active area upon which a sample material may bind with the functionalization material 124. It is noted that, in some embodiments, the at least one surface area region 125 may not include a functionalization material 124 (e.g., if the surface area region 125 is configured to act as a control).

The at least one surface area region 125 may define any suitable dimensions and/or shape on a top surface 127 of the resonator structure 120. Further, the resonator structure 120 may include any number of suitable surface area regions 125. For example, the resonator structure 120 illustrated in FIG. 3 includes two surface area regions 125 (e.g., each of which may have the same, different, or no functionalization material). In other embodiments, the resonator structure 120 may have one, three, four, five, etc. surface area regions 125 arranged on a single die 120.

Figure 6:
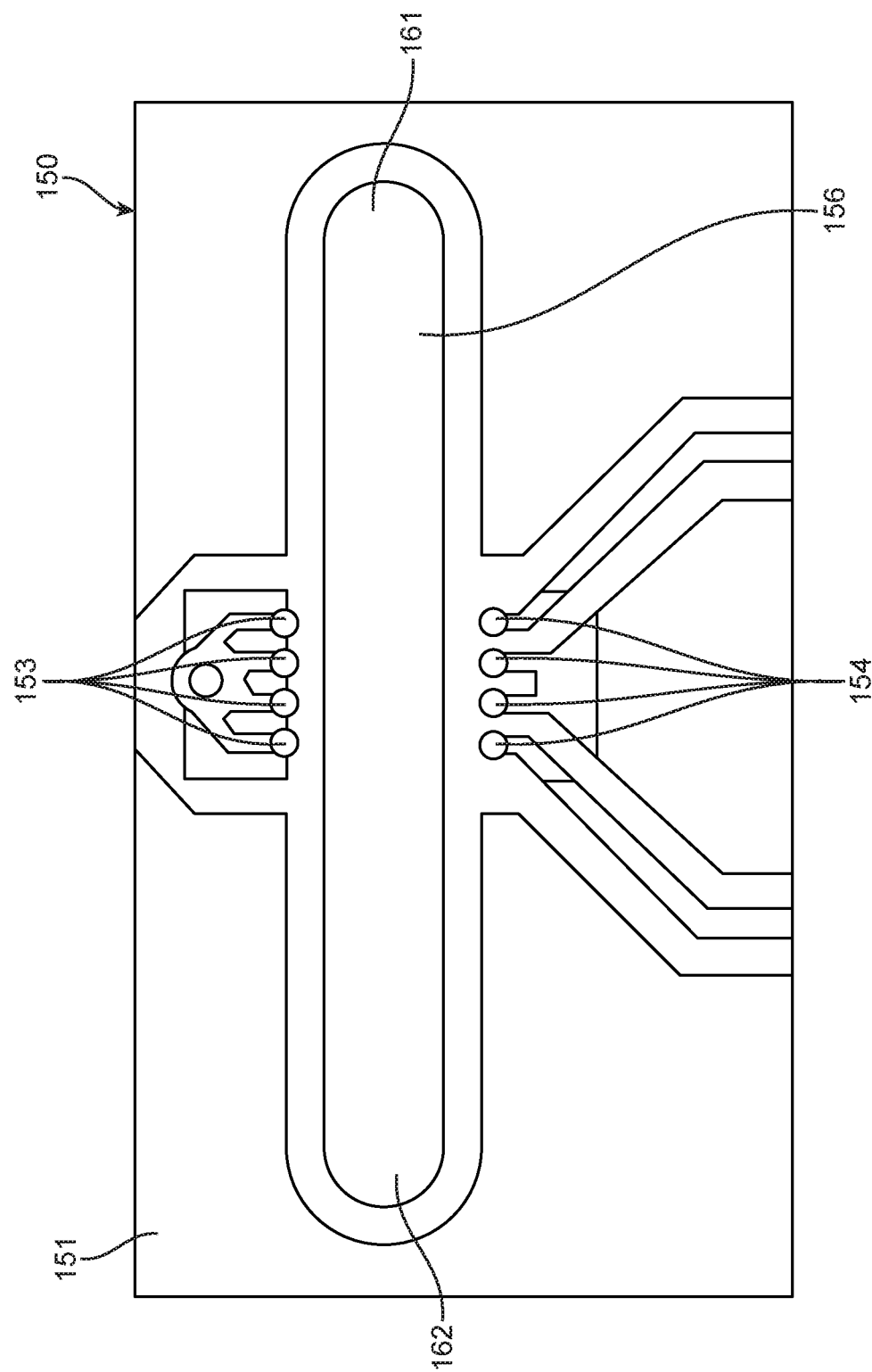
FIG. 6 illustrates an electronic board having electrical contacts.

The resonator structure 120 may include mechanical contacts 131 and electrical contacts 132 protruding from the top surface 127 of the resonator structure 120. At least one of the electrical contacts 132 may be operably coupled to the acoustic sensor at the bio-active area within the at least one surface area region 125. Further, the electrical contacts 132 may be operably coupled to an electronic board 150 (e.g., as shown in FIG. 6) such that a frequency signal from at least one resonator of the resonator structure 120 may be transmitted to the electronic board 150. The electrical contacts 132 may include (e.g., be formed of) any suitable bump materials such as, e.g., copper pillars with tin. Also, there may be any number of suitable mechanical contacts 131 and electrical contacts 132. For example, as shown in FIG. 3, there are four electrical contacts 132 proximate a first end 121 of the resonator structure 120 and four mechanical contacts 131 proximate a second end 122 of the resonator structure 120. Specifically, there may be at least two electrical contacts 132 associated with each of the at least one surface area region 125.

The resonator structure 120 may also include at least one wall 140 extending along and protruding from the resonator structure 120. For example, the at least one wall 140 may be positioned between the at least one surface area region 125 and the mechanical contacts 131 or the electrical contacts 132. The resonator structure 120 may include any suitable number of walls 140. For example, as shown in FIG. 3, the resonator structure 120 may include two walls 140 extending generally parallel to one another on opposite sides of the at least one surface area region 125 (e.g., proximate the first end 121 and the second end 122). In other embodiments, the resonator structure 120 may include one wall or more than two walls on either side of the at least one surface area region 125. Further, the at least one wall 140 may define any suitable shape. For example, as shown in FIG. 3, the at least one wall 140 may define an elongate shape that extends between sides of the resonator structure 120. In other embodiments, the at least one wall 140 may define a shape that completely surrounds the at least one surface area region 125 (e.g., contiguous or non-contiguous wall all the way around the at least one surface area region 125). Also, as shown in FIG. 3, the at least one wall 140 may include an inner wall 142 defining a middle portion extending along a straight line with each of the ends extending inwardly (e.g., towards the at least one surface area region 125) and an outer wall 141 extending along a straight line that is parallel to the middle portion of the inner wall 142.

Further yet, the at least one wall 140 may define any suitable width, length, and height. For example, the at least one wall 140 may define a width of about greater than or equal to 10 microns, greater than or equal to 15 microns, greater than or equal to 20 microns, etc. and/or less than or equal to 40 microns, less than or equal to 30 microns, less than or equal to 25 microns, etc. Also, for example, the at least one wall 140 may define a length of about greater than or equal to 500 microns, greater than or equal to 750 microns, greater than or equal to 1000 microns, etc. and/or less than or equal to 2000 microns, less than or equal to 1500 microns, less than or equal to 1250 microns, etc. Further, for example, the at least one wall 140 may define a height of about greater than or equal to 10 microns, greater than or equal to 15 microns, greater than or equal to 20 microns, etc. and/or less than or equal to 40 microns, less than or equal to 30 microns, less than or equal to 25 microns, etc. The at least one wall 140 may include (e.g., be formed of) any suitable material. For example, the at least one wall 140 may include photoimageable epoxy, photoimageable solder mask, photoimageable dry film photoresist, etc. In one or more embodiments, the at least one wall 140 may include a dry film photoimageable epoxy supplied by Tokyo Ohka Kogyo called TMMF®.

The at least one wall 140 may be positioned to assist in restricting isolation material disposed on the resonator structure (e.g., disposed proximate the electrical contacts 132) from extending into the at least one surface area region 125. However, as described herein with respect to FIGS. 2A and 2B, the at least one wall 140 alone may not completely prevent the isolation material from bleeding-out into the at least one surface area region 125.

Figure 4:
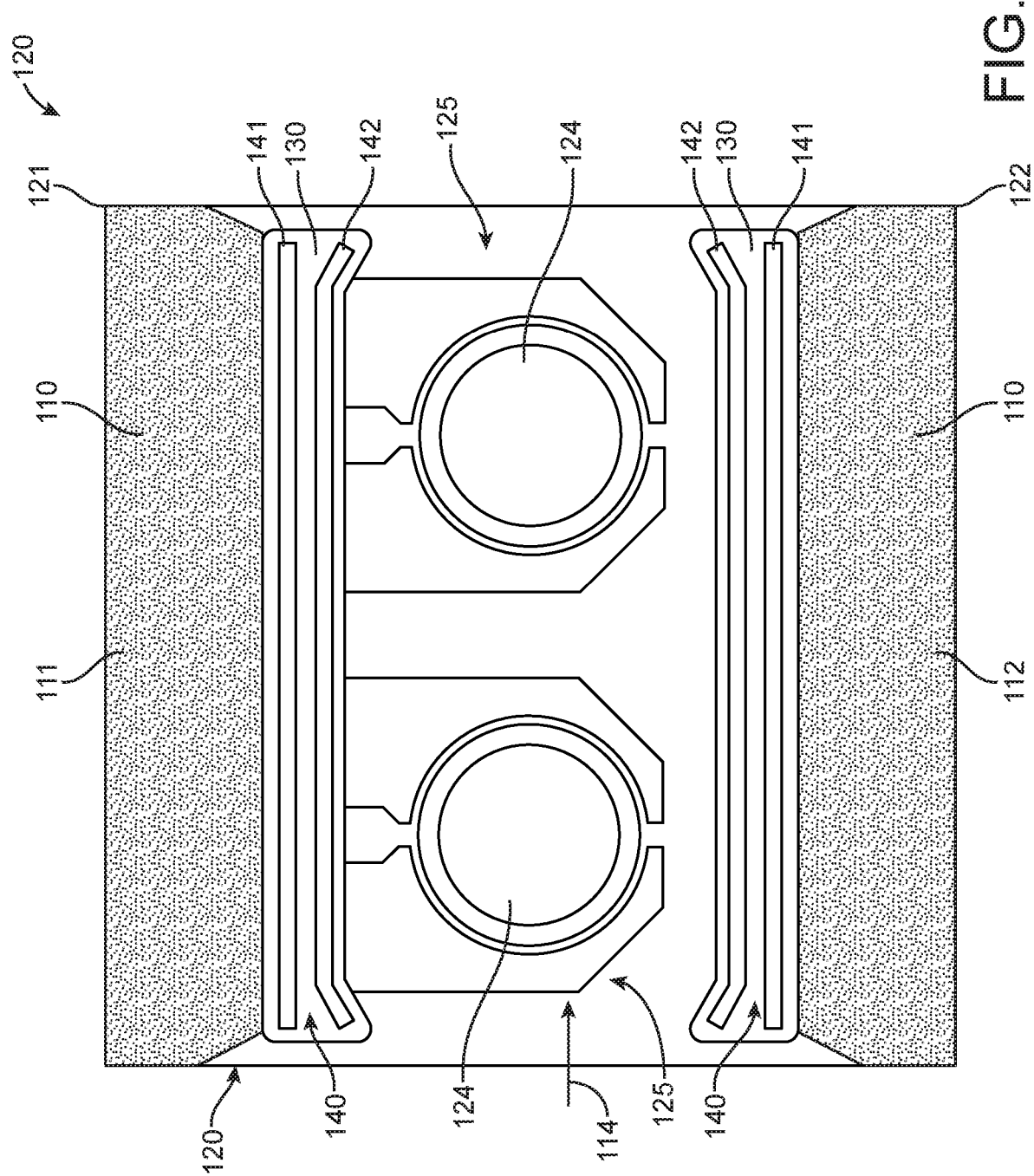
FIG. 4 illustrates a top plan view of the resonator structure of FIG. 3 including isolation material disposed thereon.
Figure 5:
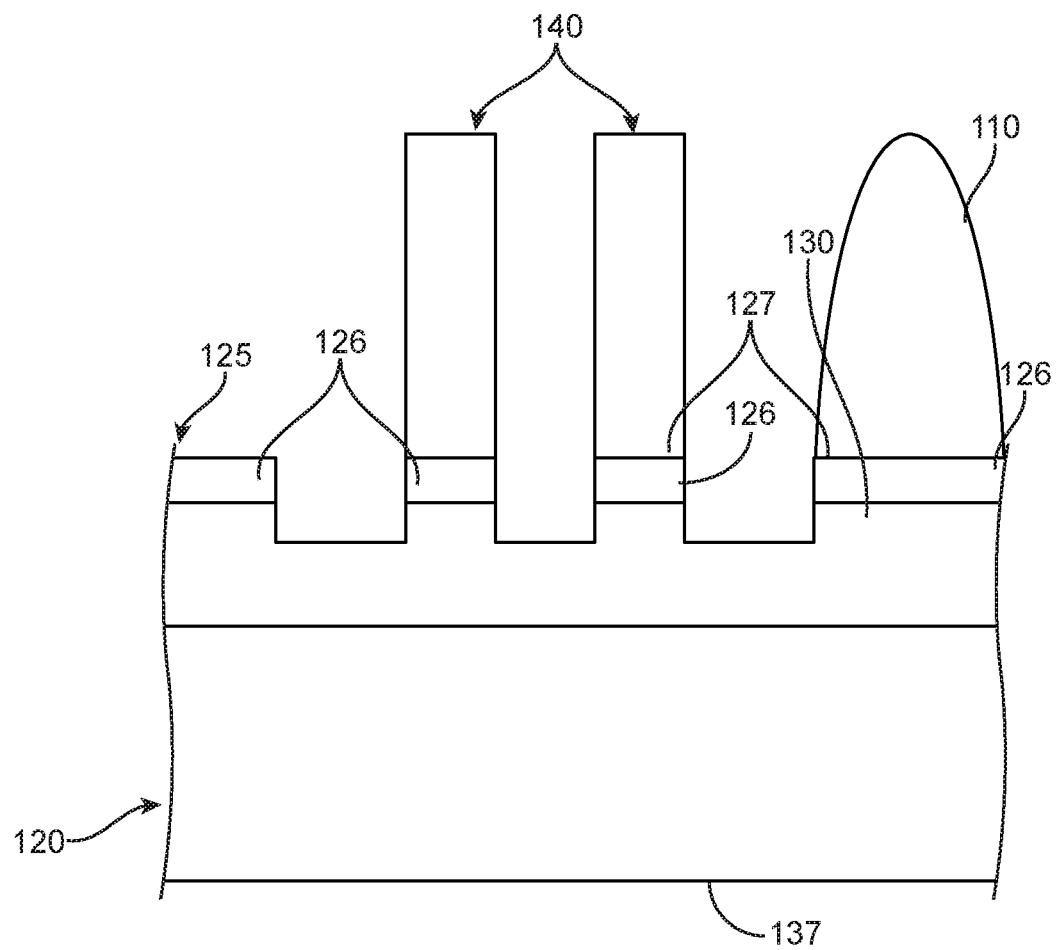
FIG. 5 illustrates an isolated cross-sectional view of the resonator structure of FIG. 4.

The resonator structure 120 may include a repelling area 130 that is configured to prevent an isolation material (e.g., epoxy underfill adhesive) from extending into the at least one surface area region 125 and disrupting operation of the BAW device. As described herein, the repelling area 130 may include any portion (e.g., a layer, a surface, etc.) of the resonator structure 120 that repels isolation material. Therefore, the repelling area 130 may be located at any suitable position that is between the at least one surface area region 125 and a location upon which the isolation material may be disposed on the resonator structure 120 (e.g., the isolation material may be disposed proximate the first and second ends 121, 122 of the resonator structure 120). For example, as shown in FIGS. 4 and 5, the repelling area 130 may form a barrier or boundary for the isolation material 110 to, e.g., prevent the isolation material 110 from entering the at least one surface area region 125. Therefore, the repelling area 130 may be located between the electrical contacts 132 (e.g., because the isolation material 110 may be disposed over the electrical contacts 132) and the at least one surface area region 125.

As shown in FIG. 3, the repelling area 130 includes two separate portions or areas. For example, a first portion 134 may be closer to the first end 121 of the resonator structure 120 and extend between sides of the resonator structure 120, and a second portion 136 may be closer to the second end 122 of the resonator structure 120 and extend between sides of the resonator structure 120. The resonator structure 120 may include any number of distinct portions of repelling area 130. For example, the resonator structure 120 may include one portion or than two portions of repelling area 130. Also, in one or more embodiments, the repelling area 130 may define a shape that completely surrounds the at least one surface area region 125 (e.g., contiguous or non-contiguous repelling area 130 all the way around the at least one surface area region 125). For example, the repelling area 130 may define a square shape, circular shape, oval shape, etc. around the at least one surface area region 125. In one or more embodiments, the repelling area 130 may define a continuous path all the way around the at least one surface area region 125 such that an interior area (e.g., including the at least one surface area region 125) is defined and an exterior area (e.g., including the electrical contacts 132) is defined and the repelling area 130 completely separates the interior area from the exterior area.

Further, as shown in FIG. 3, the repelling area 130 completely surrounds the at least one wall 140 (e.g., each portion of repelling area 130 completely surrounds a pair of walls 140). In one or more embodiments, the repelling area 130 may overlap with a portion of the at least one wall 140 or may be completely separate from the at least one wall 140. In other embodiments, the resonator structure 120 may not include any walls 140 (e.g., within the repelling area 130) and only include the repelling area 130 to prevent isolation material 110 from extending into the at least one surface area region 125.

The repelling area 130 of the resonator structure 120 or die may take any suitable form that restricts the isolation material 110 from extending across the repelling area 130. In other words, the isolation material 110 may be prevented from accessing the at least one surface area region 125 without the need to change the composition of the top surface 127 of the resonator structure 120 and/or the formulation of the isolation material 110 (e.g., because of the repelling area 130). As shown in FIG. 5, the repelling area 130 may be recessed from the top surface 127 of the resonator structure 120 (e.g., the repelling area 130 may be a sub-surface layer). For example, the repelling area 130 may be recessed from the top surface 127 by about greater than or equal to 50 angstroms, greater than or equal to 500 angstroms, greater than or equal to 1,000 angstroms, etc. and/or less than or equal to 2 microns, less than or equal to 1 micron, less than or equal to 5,000 angstroms, etc. In other words, the resonator structure 120 may include a surface layer 126 deposited on top of the repelling area 130 and the sub-layer forming the repelling area 130 may be exposed through the surface layer 126. For example, a photoresist mask may define an opening to expose the layer of the repelling area 130 and/or further processing with a pre-sputter etch may remove the surface layer 126 and expose the layer defining the repelling area 130. In other embodiments, the repelling area 130 may include a surface treatment positioned on the top surface 127 of the surface layer 126.

The surface layer 126 of the resonator structure or die may include different materials than the repelling area 130 because each may be optimized for a different purpose. For example, the surface layer 126 may include (e.g., be formed of) a silicon material such as silicon nitride, silicon dioxide, etc. The specific material of the surface layer 126 may be used due to manufacturing and/or compatibility reasons (e.g., for use with the sample material) and, therefore, may not be easily modified. Further, the material of the surface layer 126 (e.g., silicon nitride, silicon dioxide, etc.) may not prevent the movement of the isolation material 110. On the other hand, the repelling area 130 may be optimized for preventing or restricting the flow of isolation material 110. For example, the repelling area 130 may include (e.g., be formed of) any suitable material to repel the isolation material 110 in any suitable manner.

In one or more embodiments, the repelling area 130 may include any material that defines a low surface energy to, e.g., repel isolation material 110 and/or prevent isolation material 110 bleed-out. For example, the surface energy of the portion of the surface of the resonator structure 120 that repels isolation material 110 (e.g., the repelling area 130) may have a lower surface energy than surface layer 126. The surface energy of the repelling area 130 may be determined in any suitable manner. Therefore, a low surface energy repelling area 130 may stop the isolation material 110 from wicking or bleeding-out into undesirable locations on the resonator structure 120.

In one or more embodiments, water contact angle measurements may be a good indicator of surface energy. For example, high water contact angles are indicative of lower surface energy and low water contact angles are indicative of high surface energy. Accordingly, the repelling area 130 may have a high water contact angle, such as a water contact angle of 40 or greater. In some embodiments, a repelling area 130 may have a water contact angle of 50 or greater or 60 or greater. Water contact angle may be determined in any suitable manner, e.g., with a contact angle goniometer. Therefore, a water contact angle of the repelling area 130 may be indicative of the repelling area 130 restricting or preventing movement of the isolation material 110. Further, Table 1 illustrated below shows that Al2O3 (e.g., the material of the repelling area 130) may be more hydrophobic than SiO2 (e.g., the material of the surface layer 126). Table 1 illustrates that the Al2O3 water contact angle is reduced after a 20 second pre sputter etch (PSE). For example, argon pre sputter etch is a surface removal technique employed to clean a surface. Further, Table 1 shows that the Al2O3 water contact angle may be increased to a value higher than the original as deposited water contact angle of Al2O3 after processed in a chemistry that provides etching of the Al2O3, such as a dilute tetramethylammonium hydroxide (TMAH) solution. Etching the Al2O3 exposes pristine Al2O3, which increases the water contact angle.

TABLE 1

| | Water Contact Angle | | |
|---|---|---|---|
| Wafer | As-deposited Contact Angle (deg) | Post 20 s PSE Contact Angle | Post dilute TMAH soak Contact Angle |
| Al2O3 | 46 | <15 | *75 |
| Al2O3 | 52 | 27 | 64 |
| SiO2 | 32 | — | — |
| SiO2 | 32 | — | — |
| SiN | <4 | — | — |
| SiN | <4 | — | — |

In one or more embodiments, the repelling area 130 may include a hydrophobic material such as, e.g., Al2O3, fluorinated surfaces created by etching surfaces with SF6; for example, an aluminum or aluminum oxide film etched with SF6 may yield a fluorine rich hydrophobic surface. Further, the repelling area 130 may also include deposition and patterning of fluorinated materials such as photo imageable polyimides, resists, etc. In other words, the repelling area 130 may take various different forms to prevent the movement of the isolation material 110 (e.g., restrict movement into the at least one surface area region 125). Formation of a repelling zone with a fluorine rich surface yields a low surface energy surface that are water-repellant, thus, resulting in high water contact angles.

As shown in FIG. 4, the isolation material 110 may be disposed on the resonator structure 120 away from the at least one surface area region 125. For example, the isolation material 110 may be disposed in two separate portions located proximate the first and second ends 121, 122 of the resonator structure 120 such that the at least one surface area region 125 may be located between the portions of isolation material 110. As described herein, the repelling area 130 may be positioned and configured to prevent the isolation material 110 from extending into the at least one surface area region 125. For example, as shown in FIGS. 4 and 5, the isolation material 110 stops at the repelling area 130 such that the repelling area 130 acts as a boundary or a barrier. Specifically, wicking of the isolation material 110 may be stopped at the boundary of the opening where the repelling area 130 is exposed.

In one or more embodiments, the isolation material 110 may be disposed on the resonator structure 120 to cover and encompass the mechanical contacts 131 and the electrical contacts 132 (e.g., contacts 131, 132 shown in FIG. 3). For example, the isolation material 110 may surround the electrical contacts 132 to electrically isolate the electrical contacts 132 from an external environment (e.g., to prevent fluid or moisture from interacting with the electrical contacts 132). In other words, the isolation material 110 may form a fluidic seal in the zone or area of the electrical contacts 132. Further, in one or more embodiments, the isolation material 110 may be disposed on the resonator structure 120 in separate portions to define a fluidic channel therebetween. For example, as shown in FIG. 4, a first portion 111 of the isolation material 110 (e.g., proximate the first end 121) and a second portion 112 of the isolation material 110 (e.g., proximate the second end 122) may help to define a fluidic channel 114 therebetween. The fluidic channel 114 may define a fluid flow path of the resonator structure 120 such that sample material may pass over the at least one surface area region 125 (e.g., to bind with the functionalization material 124) positioned along the fluid flow path.

The isolation material 110 may include (e.g., be formed of) any suitable underfill material. For example, the isolation material 110 may include thermal curing liquid epoxy or snap curing liquid epoxy, etc. The different types of materials used to form the repelling area 130 may interact with the materials of the isolation material 110 such that the isolation material 110 may not pass through/over the repelling area 130.

Figure 8:
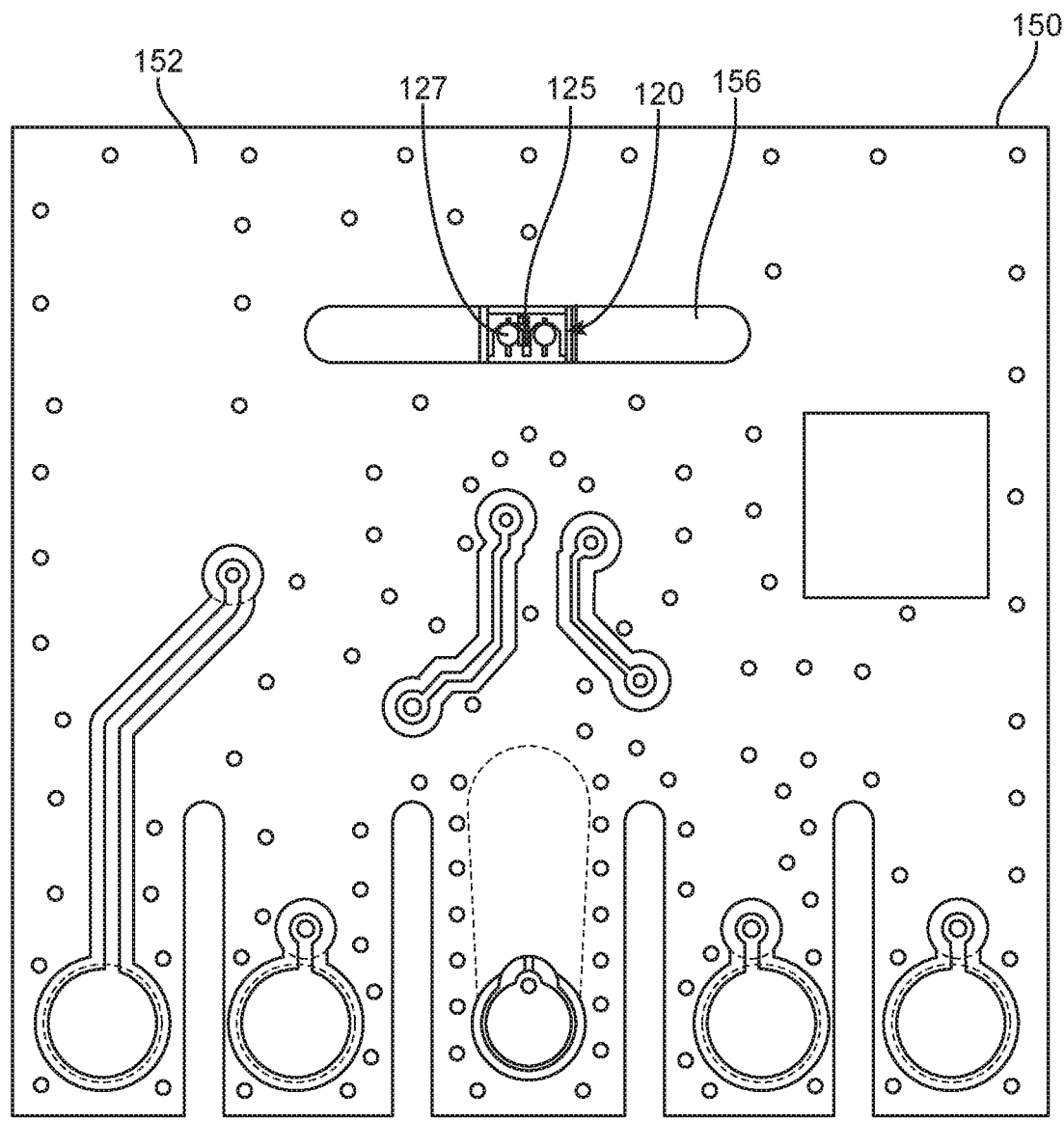
FIG. 8 illustrates the bottom plan view of the resonator structure and the electronic board of FIG. 7.

The resonator structure 120 may be attached to an electronic board 150 (e.g., as illustrated in FIG. 6) to create a fluidic sensor device 100. The electronic board 150 (e.g., a laminate) may define a top surface 151 and a bottom surface 152 (e.g., as shown in FIG. 8). The electronic board 150 may include mechanical contacts 153 and electrical contacts 154 that are positioned to operably couple to the mechanical contacts 131 (e.g., shown in FIG. 3) and the electrical contacts 132 (e.g., shown in FIG. 3) of the resonator structure 120, respectively. The electronic board 150 may also define an opening 156 that extends between the top and bottom surfaces 151, 152 and helps to form the fluidic channel 114 through which sample material flows. For example, the opening 156 of the electronic board 150 may define an elongate shape and extend between a first opening end 161 and a second opening end 162.

Figure 7:
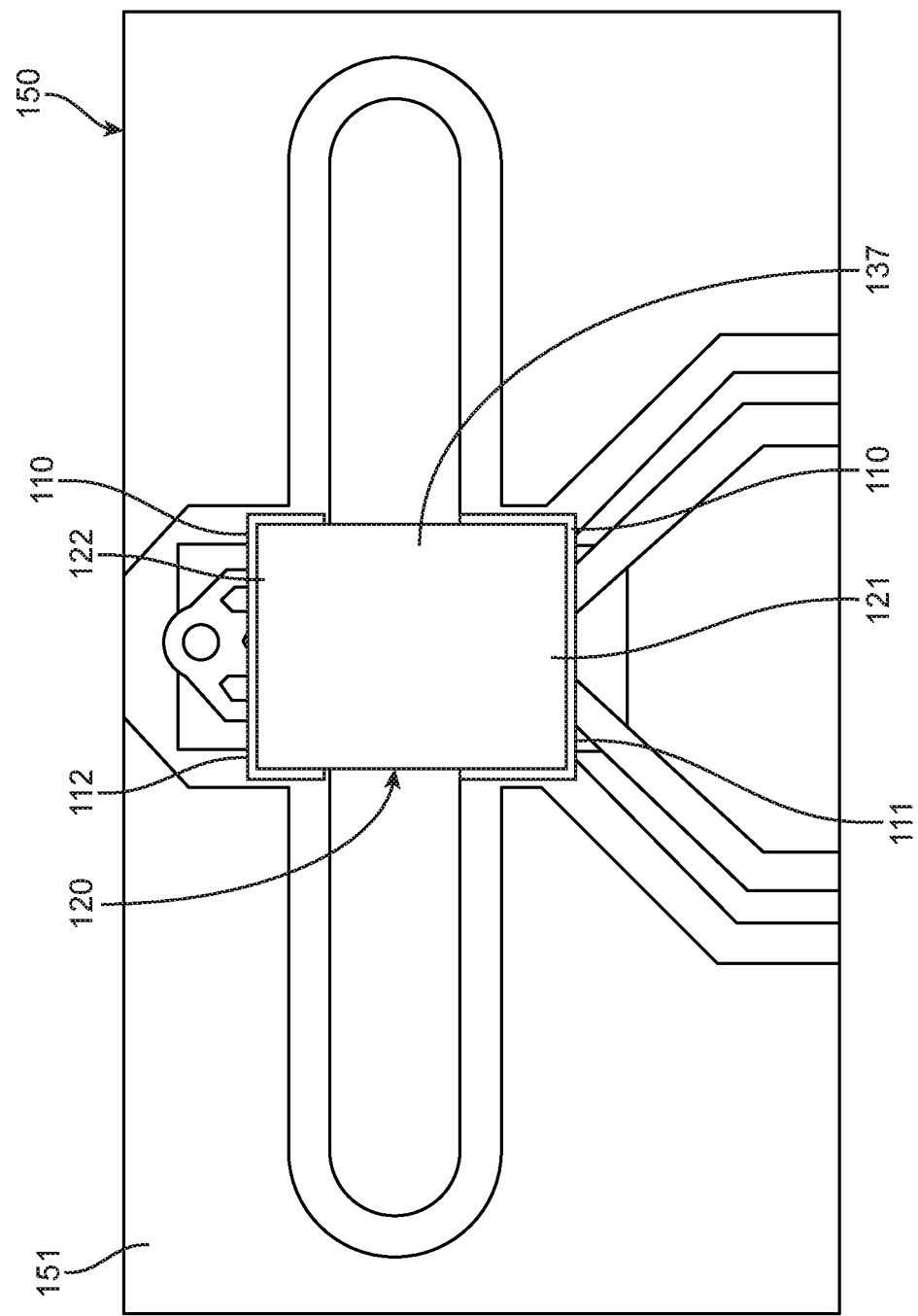
FIG. 7 illustrates the resonator structure of FIG. 3 attached to the electronic board of FIG. 6 and including isolation material disposed therebetween.

The resonator structure 120 may be attached to the electronic board 150 as illustrated in FIG. 7. For example, the resonator structure 120 may be operably coupled to the electronic board 150 (e.g., through the mechanical contacts 131 and the electrical contacts 132 attached to the mechanical contacts 153 and the electrical contacts 154, respectively) such that the top surface 151 of the electronic board 150 faces the top surface 127 of the resonator structure 120. In other words, the bottom surface 137 of the resonator structure 120 is visible in FIG. 7. Mounting the resonator structure 120 to the electronic board 150 may be described as a flip chip bond due to the top surface 127 being "flipped" and bonded to the electronic board 150. Also, as shown in FIG. 8, the top surface 127 of the resonator structure 120 (including the at least one surface area region 125) may be visible through the opening 156 of the electronic board 150. As such, the resonator structure 120 may bridge the opening 156 such that the at least one surface area region 125 may be positioned along the elongate shape of the opening 156 (e.g., between the first and second opening ends 161, 162).

When the resonator structure 120 is operably coupled to the electronic board 150, a gap may be formed therebetween (e.g., because pillar-like shape of the mechanical and electrical contacts 131, 132). In other words, the top surface 151 of the electronic board 150 may be spaced apart from the top surface 127 of the resonator structure 120 when coupled together. The isolation material 110 may be disposed within the gap between the resonator structure 120 and the electronic board 150. Specifically, the isolation material 110 (e.g., disposed by method of needle dispense or jetting adjacent to the gap between the resonator structure 120 and the electronic board 150) may self-wick between the resonator structure 120 and the electronic board 150. Further, as described herein, the resonator structure 120 may be operably coupled to the electronic board 150 on either side of the opening 156 of the electronic board 150 (e.g., due to the mechanical and electrical contacts 131, 132). The isolation material 110 may be disposed in the gap between the resonator structure 120 and the electronic board 150 on each side that is coupled. For example, the first portion 111 of the isolation material 110 may be disposed proximate the first end 121 of the resonator structure 120 and the second portion 112 of the isolation material 110 may be disposed proximate the second end 122 of the resonator structure 120. Because of the repelling area 130 of the resonator structure 120, the isolation material 110 may be contained to each end of the resonator structure 120. Therefore, the isolation material 110 may be disposed in at least a portion of the gap between the resonator structure 120 and the electronic board 150 (e.g., on either end of the resonator structure 120), but not within the at least one surface area region 125.

Figure 9:
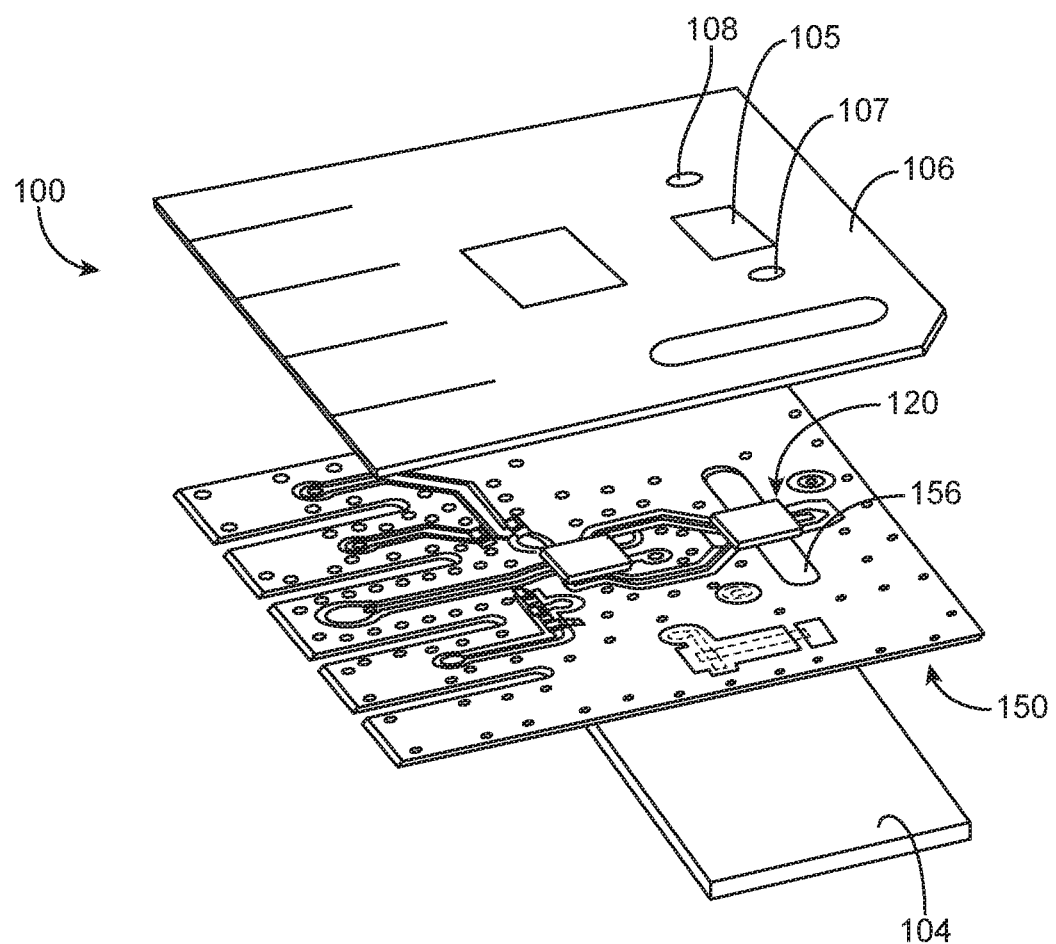
FIG. 9 illustrates the resonator structure and electronic board of FIG. 7 and including adhesive to be disposed on the electronic board.

FIG. 9 illustrates additional components of the fluidic device 100 that form the fluidic channel 114 with the resonator structure 120 and the electronic board 150. For example, the fluidic device 100 may include a first adhesive film 104 or sticker that is attached to the bottom surface 152 of the electronic board 150. The first adhesive film 104 may form a surface (e.g., a lower surface) of the fluidic channel 114 within the opening 156 of the electronic board 150. The first adhesive film 104 may define a solid sheet.

Further, the fluidic device 100 may include a second adhesive film 106 or sticker that is attached to the top surface 151 of the electronic board 150. The second adhesive film 106 may form a surface (e.g., an upper surface) of the fluidic channel 114 (e.g., as shown in FIG. 4) within the opening 156 of the electronic board 150. In one or more embodiments, the second adhesive film 106 may include a cutout 105 to accommodate the resonator structure 120. Also, the second adhesive film 106 may define a first fluidic port 107 and a second fluidic port 108 on either side of the resonator structure 120. The first and second fluidic ports 107, 108 may be aligned with the first opening end 161 and the second opening end 162 (e.g., as shown in FIG. 6), respectively, when the second adhesive film 106 is attached to the electronic board 150. Further, the first and second fluidic ports 107, 108 may be configured such that the sample material may be deposited into the fluidic channel 114 through one of the first and second fluidic ports 107, 108, pass through the fluidic channel 114 (and, e.g., past the bio-active area), and exit the fluidic channel 114 through the other of the first and second fluidic ports 107, 108.

The first and second adhesive films 104, 106 may include (e.g., be formed of) any suitable material such as, e.g., pressure sensitive adhesive on polymer substrates, etc. Further, the first and second adhesive films 104, 106 may define properties that assist in wicking or capillary action of the sample material such that, e.g., the sample material passes through the at least one surface area region 125.

Figure 10:
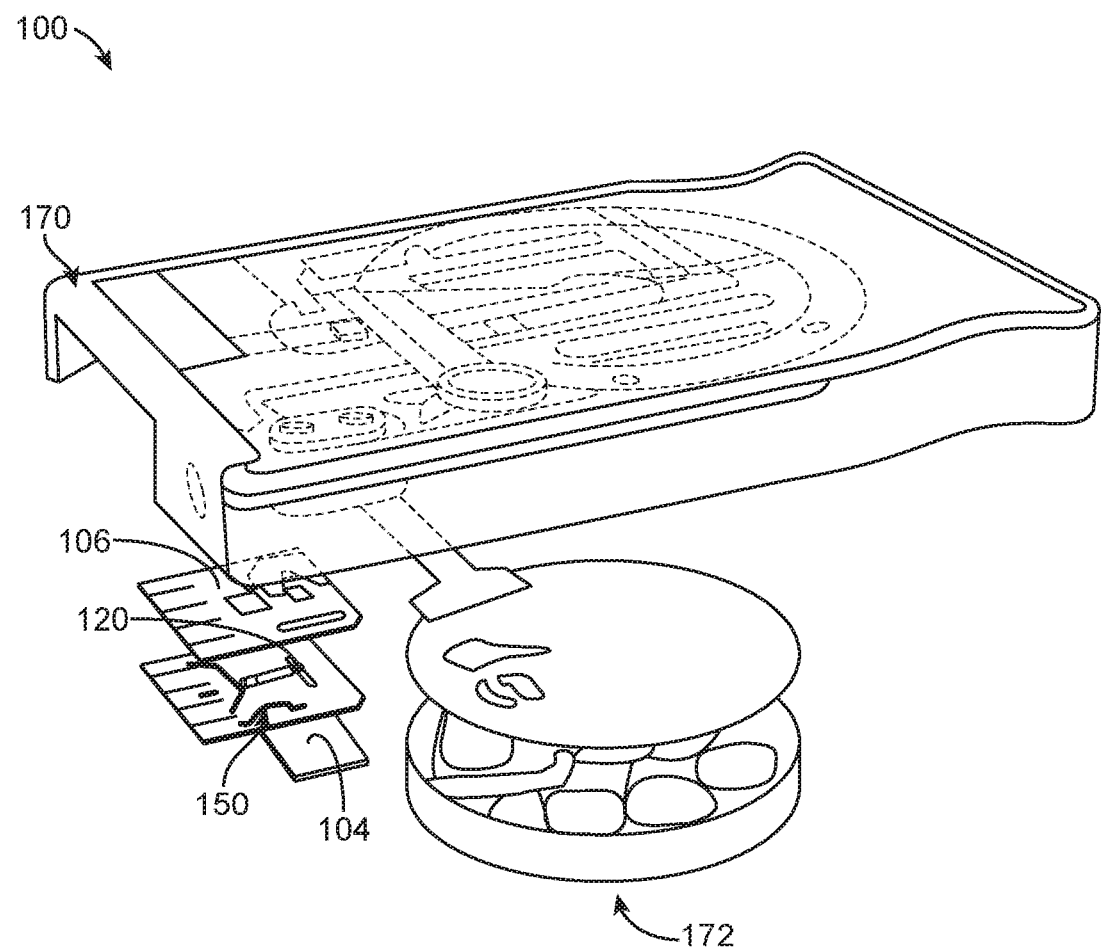
FIG. 10 illustrates the resonators structure and the electronic board of FIG. 7 in relation to an illustrative cartridge body assembly.

FIG. 10 illustrates the resonator structure 120 and the electronic board 150 in relation to other components of the fluidic device 100. For example, the fluidic device 100 may include a cartridge body 170 within which the electronic board 150 is positioned and a carousel assembly 172 positioned relative thereto.

Figure 11:
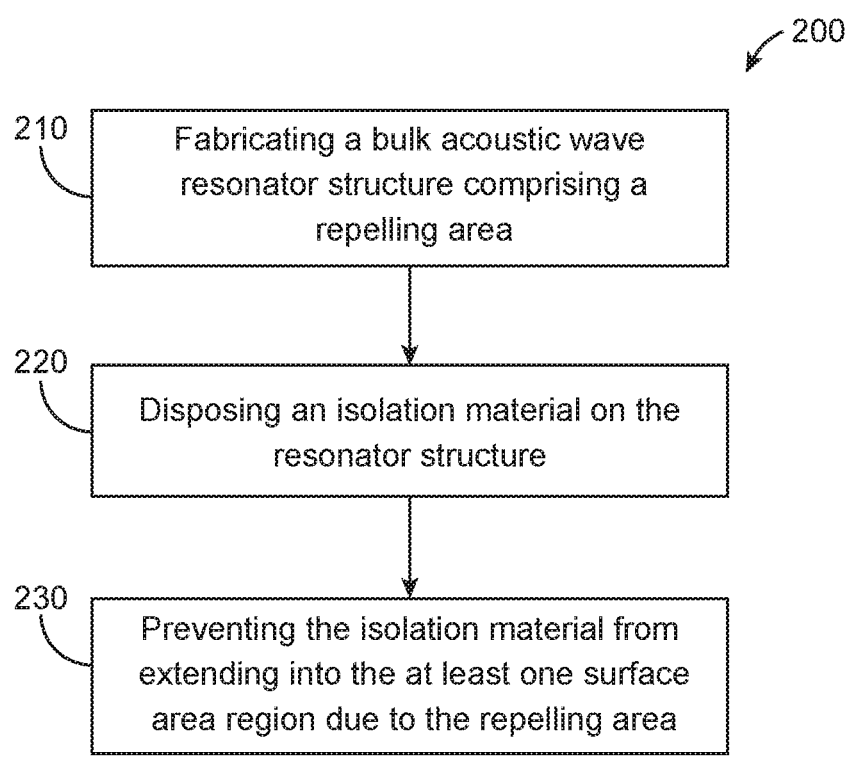
FIG. 11 illustrates a method of preventing isolation material bleed-out for a fluidic device.

An illustrative method 200 of preventing isolation material bleed-out for a fluidic device is illustrated in FIG. 11. The method 200 may include fabricating 210 a bulk acoustic wave (BAW) resonator structure including a repelling area and defining at least one surface area region on which a functionalization material is disposed. The resonator structure may be configured to receive a sample material and measure differing frequency shifts based on the degree to which the sample material binds with the functionalization material. The method 200 may also include disposing 220 an isolation material on the resonator structure and away from the at least one surface area region. Disposing 220 the isolation material may include forming a fluidic channel between multiple portions of isolation material (e.g., a first portion of isolation material proximate a first end of the resonator structure and a second portion of isolation material proximate a second end of the resonator structure). Also, disposing 220 the isolation material may include surrounding electrical contacts operably coupled between an electronic board and the resonator structure to electrically isolate the electrical contacts from an external environment (e.g., any moisture or fluid from the fluidic channel). The method 200 may also include preventing 230 the isolation material from extending into the at least one surface area region due to the repelling area.

In one or more embodiments, fabricating 210 the resonator structure may include etching a surface layer of the resonator structure to expose the repelling area (e.g., using a polymer photoresist mask). In one or more embodiments, the method 200 may also include attaching the resonator structure to an electronic board such that a gap is formed between the resonator structure and the electronic board, e.g., such that isolation material may be disposed therebetween. In one or more embodiments, the fabricating 210 the resonator structure may include forming at least one wall extending from the resonator structure and positioned adjacent to at least a portion of the at least one surface area region. Further, in one or more embodiments, fabricating 210 the resonator structure may include forming the repelling area to surround the at least one wall.

Illustrative embodiments are described and reference has been made to possible variations of the same. These and other variations, combinations, and modifications will be apparent to those skilled in the art, and it should be understood that the claims are not limited to the illustrative embodiments set forth herein.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Any direction referred to herein, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

What is claimed is:

1. A fluidic device comprising:
a bulk acoustic wave resonator structure defining at least one surface area region on which a functionalization material is disposed and wherein the bulk acoustic wave resonator structure comprises a repelling area; and
an isolation material disposed on the bulk acoustic wave resonator structure and away from the at least one surface area region, wherein the repelling area is configured to prevent the isolation material from extending into the at least one surface area region.

2. The fluidic device of claim 1, further comprising an electronic board attached to the bulk acoustic wave resonator structure such that a gap is formed between the electronic board and the bulk acoustic wave resonator structure, wherein the isolation material is disposed in at least a portion of the gap.

3. The fluidic device of claim 2, further comprising a plurality of electrical contacts operably connecting the electronic board and the bulk acoustic wave resonator structure, wherein the isolation material surrounds the electrical contacts to electrically isolate the electrical contacts from an external environment.

4. The fluidic device of claim 1, wherein the bulk acoustic wave resonator structure comprises a surface layer and the repelling area is exposed through the surface layer.

5. The fluidic device of claim 1, wherein the repelling area is located between the isolation material and the at least one surface area region.

6. The fluidic device of claim 1, further comprising at least one wall extending away from the bulk acoustic wave resonator structure and positioned adjacent to at least a portion of the at least one surface area region.

7. The fluidic device of claim 6, wherein the repelling area surrounds the at least one wall.

8. The fluidic device of claim 1, wherein the bulk acoustic wave resonator structure extends between a first end and a second end, wherein a first portion of the isolation material is disposed at the first end of the bulk acoustic wave resonator structure and a second portion of the isolation material is disposed at the second end of the bulk acoustic wave resonator structure such that the isolation material defines a fluidic channel between the first and second portions of the isolation material.

9. The fluidic device of claim 1, wherein the bulk acoustic wave resonator structure defines a top surface, and wherein the repelling area is recessed from the top surface.

10. The fluidic device of claim 1, wherein the repelling area defines a water contact angle of greater than 40 degrees.

11. A method of preventing isolation material bleed-out for a fluidic device, comprising:
fabricating a bulk acoustic wave resonator structure comprising a repelling area and defining at least one surface area region on which a functionalization material is disposed;
disposing an isolation material on the bulk acoustic wave resonator structure and away from the at least one surface area region; and
preventing the isolation material from extending into the at least one surface area region due to the repelling area.

12. The method of claim 11, further comprising attaching the bulk acoustic wave resonator structure to an electronic board such that a gap is formed between the bulk acoustic wave resonator structure and the electronic board, wherein the isolation material is disposed in at least a portion of the gap.

13. The method of claim 12, wherein disposing the isolation material comprises surrounding a plurality of electrical contacts operably connected between the electronic board and the bulk acoustic wave resonator structure to electrically isolate the electrical contacts from an external environment.

14. The method of claim 11, wherein fabricating the bulk acoustic wave resonator structure comprises etching a surface layer of the bulk acoustic wave resonator structure to expose the repelling area.

15. The method of claim 11, wherein disposing the isolation material comprises disposing a first portion of the isolation material at a first end of the bulk acoustic wave resonator structure and a second portion of the isolation material at a second end of the bulk acoustic wave resonator structure.

16. The method of claim 15, wherein disposing the isolation material further comprises forming a fluidic channel between the first portion of the isolation material and the second portion of the isolation material.

17. The method of claim 11, wherein fabricating the bulk acoustic wave resonator structure comprises forming at least one wall extending from the bulk acoustic wave resonator structure and positioned adjacent to at least a portion of the at least one surface area region.

18. The method of claim 17, wherein fabricating the bulk acoustic wave resonator structure comprises forming the repelling area to surround the at least one wall.

19. The method of claim 11, wherein the repelling area defines a water contact angle of greater than 40 degrees.

20. The method of claim 11, wherein the repelling area comprises hydrophobic material.

* * * * *